UNITED STATES PATENT OFFICE.

EDMUND C. LIPPINCOTT, OF EATONTOWN, NEW JERSEY, AND THOMAS R. C. WEST AND JAMES WEST, OF BROOKLYN, NEW YORK.

IMPROVEMENT IN MEDICAL COMPOUNDS.

Specification forming part of Letters Patent No. 146,831, dated January 27, 1874; application filed June 14, 1873.

*To all whom it may concern:*

Be it known that we, EDMUND C. LIPPINCOTT, of Eatontown, Monmouth county, New Jersey, and THOMAS R. C. WEST and JAMES WEST, of Brooklyn, Kings county, New York, have invented a new and Improved Compound for Treating Cancers, of which the following is a specification:

Our improved compound for the cure of cancers is made of the juice of sheep-sorrel, turpentine, and muriatic acid, in the following manner: We take, say, one quart of the juice of sheep-sorrel, obtained by pounding and macerating the plant, and straining off the juice; pour it on a pewter platter previously heated in the sun; mix about half a gill of turpentine and a half ounce of acid, and stir the whole mass till it is reduced by evaporation to a thick, pasty state, when it is complete, and ready for use.

We apply it to the parts affected in the ordinary way of using such remedies.

We consider it material to the development of the best qualities of our remedy that the mixing and evaporating process be performed under the influence of the sun, and a vessel of pewter, as before stated.

Having thus described our invention, we claim as new and desire to secure by Letters Patent—

The compound herein described, made of the aforesaid substances, in about the proportions and by the process specified.

EDMUND C. LIPPINCOTT.
THOMAS R. C. WEST.
JAMES WEST.

Witnesses:
T. B. MCSHER,
ALEX. F. ROBERTS.